(12) United States Patent
Hopfe et al.

(10) Patent No.: US 6,244,289 B1
(45) Date of Patent: Jun. 12, 2001

(54) VENT SYSTEM

(76) Inventors: Helmut W. Hopfe, 5121 Lexington St., Erie, PA (US) 16509; Christopher B. Laird, 3702 Emmet Dr., Erie, PA (US) 16511; William H. Noble, 613 Cherry St., Waterford, PA (US) 16441

( * ) Notice: Subject to any disclaimer, the term of this patent is extended or adjusted under 35 U.S.C. 154(b) by 0 days.

(21) Appl. No.: 09/232,302

(22) Filed: Jan. 15, 1999

(51) Int. Cl.[7] .................................................. F16K 24/04
(52) U.S. Cl. ......................... 137/197; 137/552; 137/587; 73/259
(58) Field of Search ................................. 137/197, 202, 137/551, 552, 583, 587; 73/259

(56) References Cited

U.S. PATENT DOCUMENTS

| | | | |
|---|---|---|---|
| 1,404,995 | * | 1/1922 | Mouat ..................................... 137/197 |
| 3,059,473 | * | 10/1962 | Granberg ................................ 73/259 |
| 3,683,694 | * | 8/1972 | Granberg ................................ 73/259 |
| 3,888,274 | * | 6/1975 | Weston ............................... 137/202 X |
| 4,079,743 | * | 3/1978 | Weston ............................... 137/202 X |
| 4,640,125 | * | 2/1987 | Carpenter .............................. 73/259 |
| 5,339,685 | | 8/1994 | Janssen et al. ......................... 73/199 |
| 5,392,804 | * | 2/1995 | Kondo et al. ......................... 137/202 |
| 5,404,906 | * | 4/1995 | Aoshima et al. .................... 137/587 |

OTHER PUBLICATIONS

MOORCO Drawing No. 553078, p. 1 or 2, entitled M–16 Rotor Bleed Assembly, dated 6/91, and 2 of 2, entitled JB–10 Rotor Bleed Assembly, dated 6/91, both pages showing subject matter that was offered for sale more than one year prior to the filing date of this application (the apparatus shown on these pages is of the type described in this application as prior art from p. 2, line 15 through p. 3, line 7). The customer name has been removed from the "Made For" block for confidentially purposes.

FMC Energy Systems Drawing entitled "Standard Vent Arrangement for Smith PD Meter Models; JA10, JB10, K12 and M16;" showing subject matter that was offered for sale more than one year prior to the filing date of this application.

* cited by examiner

Primary Examiner—John Rivell
(74) Attorney, Agent, or Firm—Michael C. Penn

(57) ABSTRACT

A vent assembly for a double case, rotary positive displacement meter permits venting of the outer housing chamber and inner mechanism chamber simultaneously through a single port in the outer housing to prevent damage to the rotor of the inner mechanism. A float/reed switch assembly can be provided to provide an indication of the need for venting if the vent is manually operated, or to automatically vent if an electrically operated valve is used.

14 Claims, 5 Drawing Sheets

VENT SYSTEM

BACKGROUND OF THE INVENTION

The present invention relates to venting, and, more particularly, to a vent system for venting chambers.

Positive displacement meters are used to measure the volume of a liquid flowing through a line. For example, positive displacement meters are commonly used to measure the volume of oil transferred to a buyer. The meter is placed in the line that transports the liquid, and as the liquid flows through the meter it is metered.

A double case rotary positive displacement meter includes an inner mechanism with a rotor that is rotated by the liquid as it flows through the meter. Vanes, which are part of the rotor assembly, slide through slots to form measuring chambers that measure the volume of the liquid flowing through the meter. Typically, the vanes are constructed of aluminum, and the rotor is constructed of cast iron. The meter includes two housings, or cases. The inner mechanism housing encases the inner mechanism, and the outer housing encases the entire meter, including the inner mechanism.

During normal operation of the meter, the interior of the meter, including the entire interior of the rotor, is filled with the liquid. The liquid within the rotor, being essentially incompressible, enables the rotor walls to resist rapid pressure variations exerted on the rotor by the liquid outside the rotor. That is, when the rotor is completely filled with liquid, there is a balance of pressure between the exterior and interior of the rotor. However, gas pockets can occur within the rotor, typically when the meter has just been installed in a line or when the inner mechanism has been replaced. Gas pockets can also form from dissolved gas in the liquid during operation of the meter. When gas pockets are present within the rotor, the interior of the rotor is not incompressible, and rapid pressure variations from outside can cause the rotor to collapse, thus preventing the vanes from sliding within the slots in the rotor. This can cause major damage or destruction to the rotor and vanes. It is, therefore, desirable to vent the gas from the inner mechanism chamber and rotor.

Although gas pockets in the outer housing chamber will not damage the rotor, it is desirable to vent the outer housing chamber to improve the accuracy of the meter, and to prevent gas in the outer chamber from being passed downstream of the meter.

Because failure to vent gas from inside the rotor can cause failure of the meter, it is also desirable to provide some indication that gas is not present within the rotor, both prior to startup of the meter and during its operation.

One known system addresses this problem by providing a vent through the outer housing that vents the outer housing chamber through a first port, and a vent through the inner mechanism housing that is connected to a second port in the outer housing by a flexible hose. If used properly, this technique provides adequate venting during startup. However, the use of separate vents is awkward, and the lack of a gas detector makes its use during operation impractical. Also, care must be taken to choose a hose material that is compatible with the fluid being measured, and that can withstand the pressure within the outer housing chamber. Further, the hose that is connected to the outer housing cover must be connected with a coupling to the fitting that is connected to the port on the inner mechanism cover. The hose is relatively short and must be coupled before the cover is assembled. Therefore, the outer housing cover must be fitted in place and lifted as little as possible to enable coupling of the short hose to the fitting connected to the inner mechanism vent port. This operation is awkward and, in fact, dangerous, since an individual must reach under the heavy cover and into the outer housing chamber to make the connection, risking injury to the individual's arm if the cover should drop during the operation. It is desirable to eliminate the need for an individual to reach into the outer housing chamber to couple the hose to the inner mechanism vent port.

SUMMARY OF THE INVENTION

A vent assembly is provided that permits venting of two chambers of an apparatus through a single port. Where the apparatus is a double case, rotary positive displacement meter, the invention permits venting of the outer housing chamber and inner mechanism chamber through a single vent port. An assembly, such as a float/reed switch assembly, can be provided to provide an indication of the need for venting. To vent the chambers the vent may be manually or automatically operated.

BRIEF DESCRIPTION OF THE DRAWING

The following detailed description of the preferred embodiment may be understood better if reference is made to the appended drawing, in which.

DETAILED DESCRIPTION OF THE PREFERRED EMBODIMENTS

Figure 1:
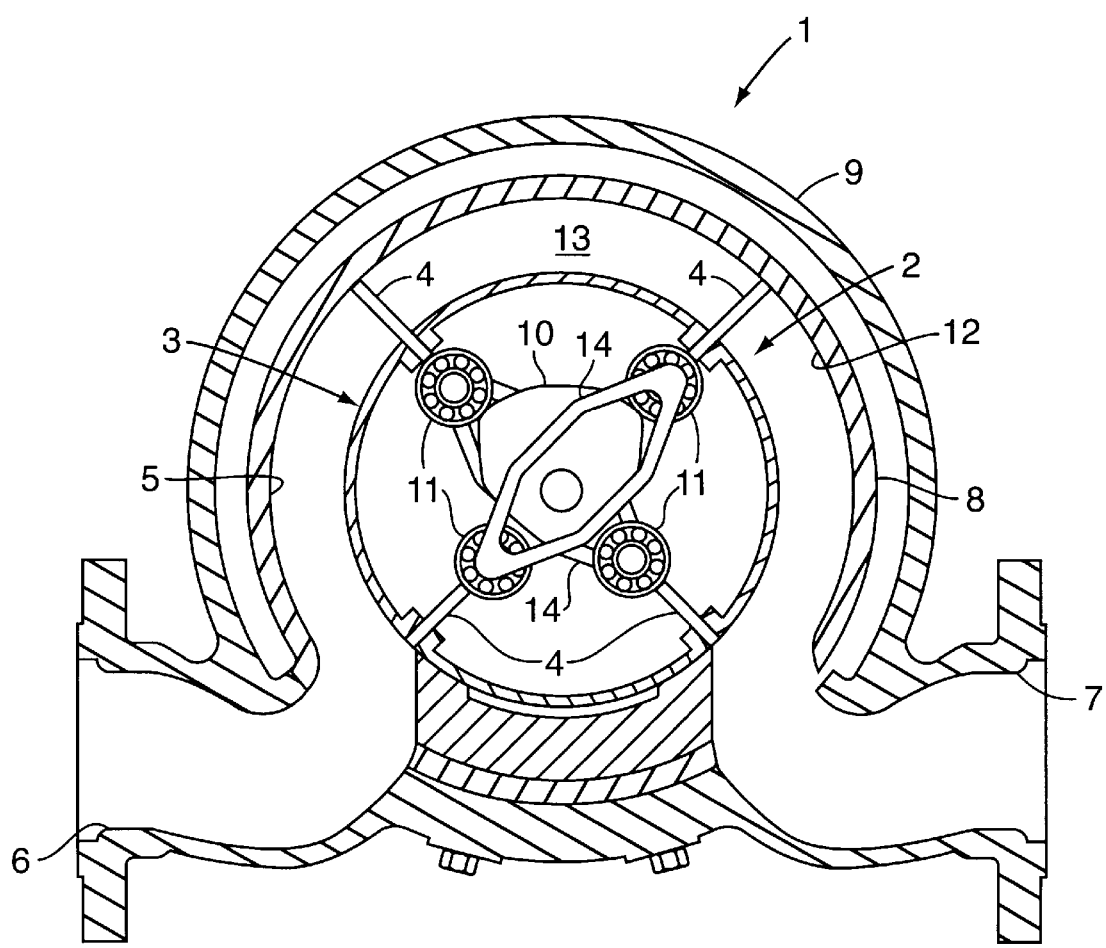
FIG. 1 is a graphical representation of a double case, rotary positive displacement meter.

FIG. 1 shows very generally a double case rotary positive displacement meter 1 that is well-known in the art. Meter 1 is placed in the flow line carrying the fluid whose flow is to be measured. Meter 1 has an inner mechanism 2 that includes a hollow cylindrical internal rotor 3 with four movable vanes 4 that form measuring chambers as rotor 3 is rotated by the action of fluid flowing through flow passage 5 from inlet 6 to outlet 7. Yokes 14 support bearings 11 and vanes 4. Meter 1 receives fluid from the flow line through inlet 6, and returns fluid to the flow line through outlet 7. Meter 1 has two main housings. An inner mechanism housing 8 encases inner mechanism 2 of meter 1. An outer housing 9, encases the entire meter 1, including the inner mechanism 2 and inner mechanism housing 8. The liquid flowing through flow passage 5 causes rotor 3 and vanes 4 to revolve around a fixed cam 10. Bearings 11 which support vanes 4 roll around cam 10 as rotor 3 rotates, causing vanes 4 to reciprocate in the radial direction. Each vane 4 is moved by cam 10 between a fully extended position, in which vane 4 reaches nearly to the inner surface 12 of inner mechanism housing 8, and a fully retracted position, in which vane 4 is fully withdrawn from flow passage 5. At four times during one full revolution of cam 10, there are a pair of adjacent fully extended vanes that form a measuring chamber 13. Measuring chamber 13 is filled with a known volume of the fluid flowing through meter 1. All the fluid flowing through meter 1 is segmented in known, constant volumes by this action of vanes 4 and cam 10. Accordingly, the volume of fluid flowing through meter 1 can be determined from the number of rotations made by rotor 3 and the volume of fluid contained by measuring chamber 13. A gear assembly (not shown in FIG. 1) can be coupled to the rotor 3 and to a mechanical display or device or counter (not shown in FIG. 1) to provide a display of volume. While FIG. 1 shows a rotor assembly with two yokes 14 and four vanes 4, three yokes 14 and six vanes 4 may be provided for larger sized meters, as is well known in the industry.

Figure 2:
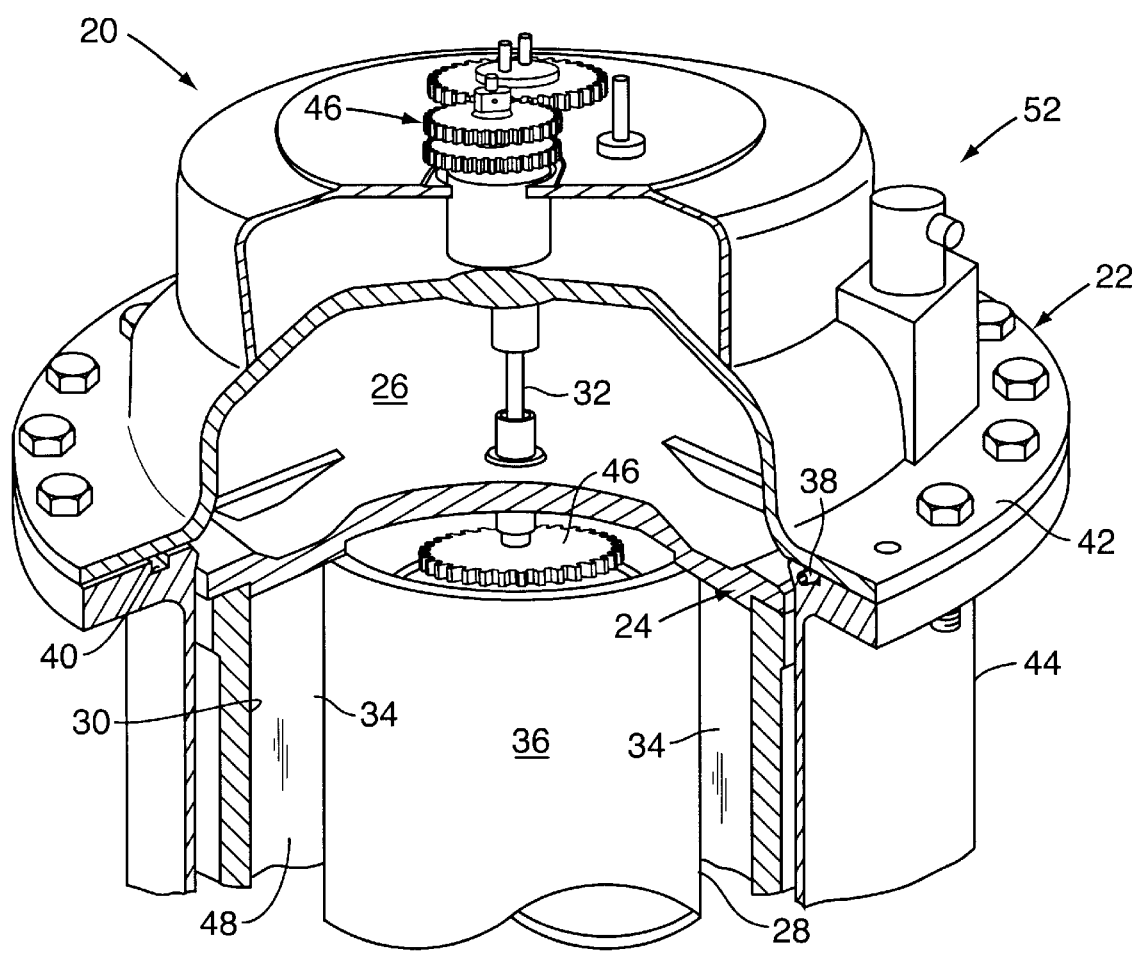
FIG. 2 is a sectional, perspective view of a double case, rotary positive displacement meter of the type shown generally in FIG. 1, showing in graphic form a vent assembly constructed according to the provisions of the present invention.
Figure 3:
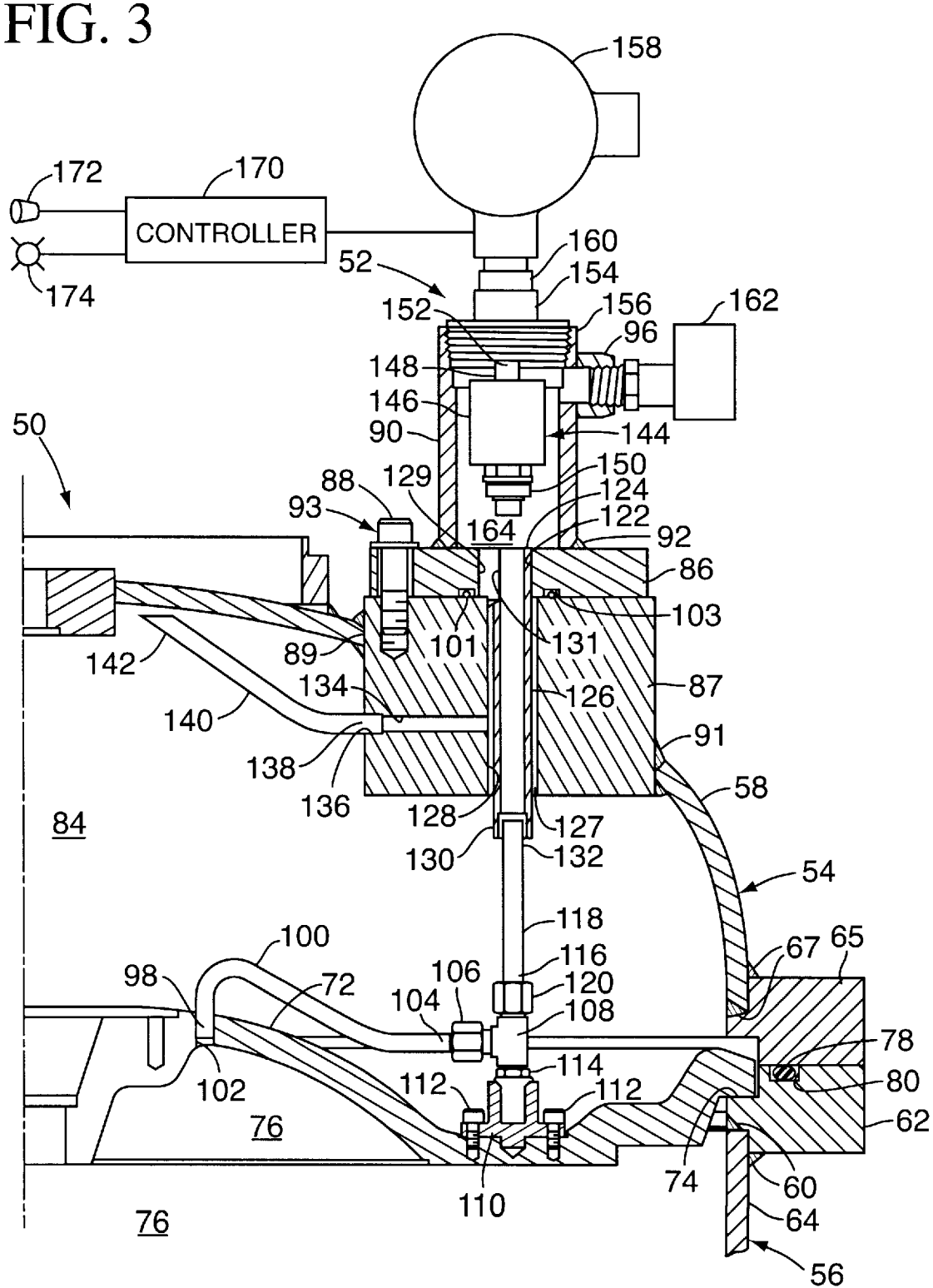
FIG. 3 is a sectional view of a part of a double case, rotary positive displacement meter of the type generally shown in FIGS. 1 and 2 with the vent assembly shown in FIG. 2.
Figure 4:
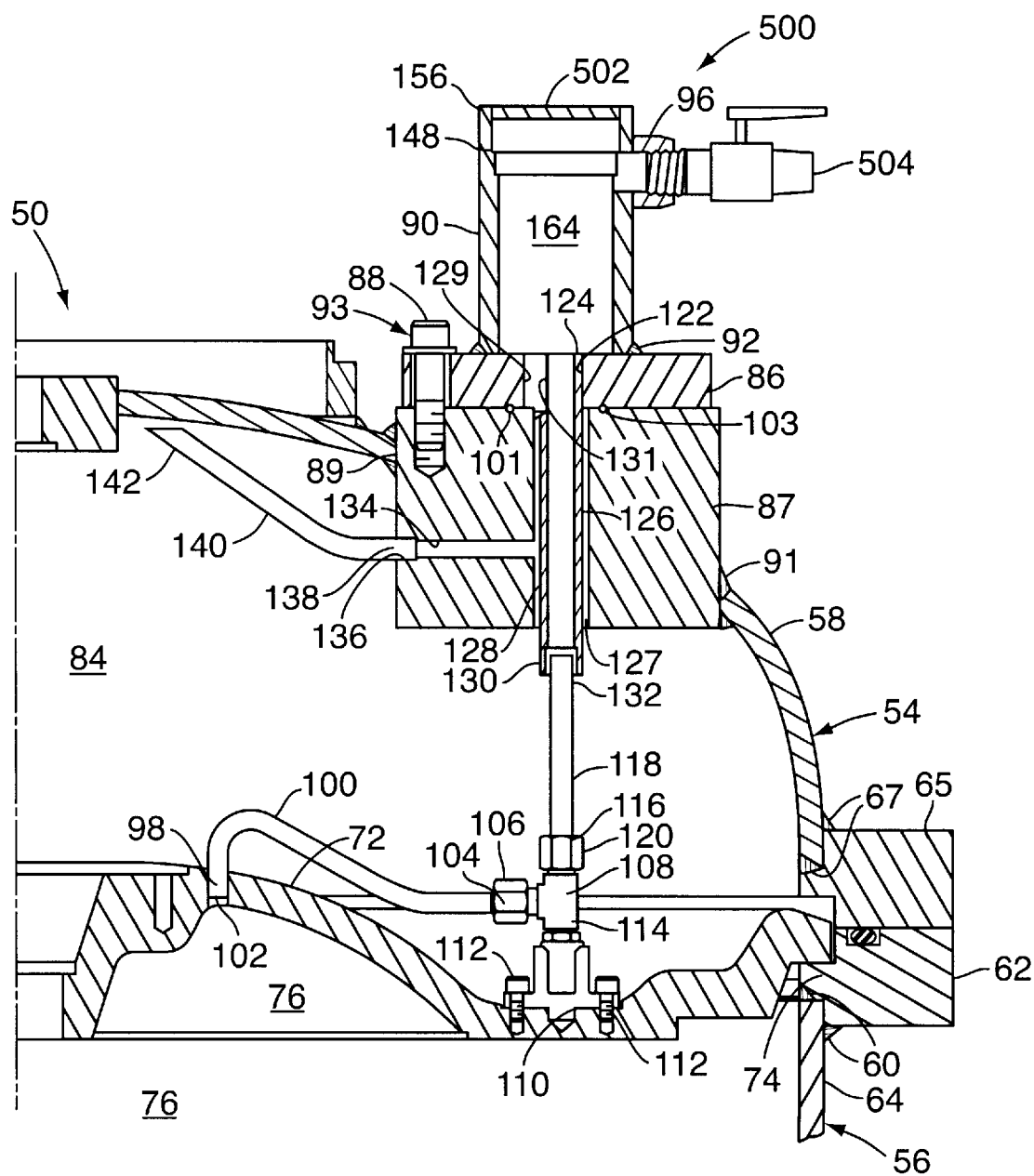
FIG. 4 is a sectional view of the part of the meter shown in FIG. 3, but with a vent assembly that does not include a float/reed switch assembly or controller.

FIGS. 2, 3 and 4 show a double case, rotary positive displacement meters with a vent assembly constructed in accordance with the teachings of the present invention. While a positive displacement meter is shown, the invention may be used with any apparatus having two chambers that must be vented. Meters typical of those shown in FIGS. 2, 3 and 4 include those manufactured and sold by Smith Meter Inc., Erie, Pa., and identified in Smith Meter Inc., Bulletin SB01006 (9/92) as Models C2, E3, E4, F4, G6, H8, JA10, JB10, K12 and M16. Only a very general description of the functioning and construction of the meters will be given below since they are well known in the art.

FIG. 2 shows the basic construction of those sections of a known double case, rotary positive displacement meter 20 that involve the present invention, along with a graphic representation of a vent assembly 52 provided by the present invention. Meter 20 includes outer housing 22 and an inner mechanism housing 24, which define outer housing chamber 26. Vent assembly 52 is mounted in an opening formed in outer housing 22. An o-ring 38 is mounted within a seat 40 of housing 22 and seals the space between components 42 and 44 of housing 22. Fluid from the flow line passes through meter 20 through flow passage 48. A rotor 28 is mounted for rotation within inner mechanism chamber 30 with an output shaft 32. Vanes 34 can be seen in their extended positions forming a measuring chamber 36. Fluid flowing through passage 48 rotates rotor 28 by exerting force against vanes 34. Gearing 46 converts the rotary motion of rotor 28 to a rotary motion that serves as the input to a mechanical display device or counter (not shown) that displays the volume of fluid passing through meter 20. Vent assembly 50 is mounted to component 42 of housing 22.

FIG. 3 shows vent assembly 52 installed in a double case, rotary positive displacement flow meter 50. Meter 50 is a Smith Meter Inc. Model K-12-S3. Meter 50 includes an outer housing 54 including a housing case 56 and a housing cover 58. Housing case 56 includes a mounting flange 62 that is welded to housing body 64 at 60. Housing cover 58 includes a mounting flange 65 that is welded to housing cover 58 at 67. Mounting flange 62 and housing cover 58 define a series of openings (not shown in FIG. 3) that are used to bolt flange 65 to flange 62. Meter 50 includes an inner mechanism cover 72 that rests on seat 74 of outer housing 54, and that encloses the inner mechanism (only cover 72 being shown in FIG. 3) within inner mechanism chamber 76. An o-ring 78 is seated in seat 80 defined by flange 62 and seals the space between flange 62 and flange 65.

Vent assembly 52 is mounted to outer housing cover 58 and inner mechanism cover 72. Vent assembly 52 simultaneously vents inner mechanism chamber 76 and outer housing chamber 84. Accordingly, only one vent port is required. Vent assembly 52 includes a cylindrical vent block 87 that is welded to the edges of an opening 89 formed in housing cover 58 at 91. Vent assembly 52 includes a cylindrical vent mounting 86 that is secured to vent block 87 with four screw and washer assemblies 93 (only one assembly shown). An o-ring 101 is mounted within a seat 103 formed in vent mounting 86, and seals the space between vent mounting 86 and vent block 87. A cylindrical vent housing 90 is welded to the upper surface of mounting 86 at 92. Housing 90 defines a vent chamber 164 and a vent outlet 96 to which a valve 162 is mounted to vent gas from chambers 76 and 84.

The inlet 98 of a tube 100 is secured within opening 102 formed in inner mechanism cover 72, and is in fluid communication with inner mechanism chamber 76. The outlet 104 is mounted to one port 106 of a tee coupling 108. A mounting adapter 110 is secured to the upper surface of inner mechanism cover 72 with a pair of screws 112. A second port 114 of tee coupling 108 is secured to the mounting socket of mounting adapter 110. The inlet end 116 of a tubular spacer 118 is secured to the third port 120 of tee coupling 108.

Vent mounting 86 defines a passage 122 in which is mounted end 124 of a vent tube 126. Tube 126 extends through an oversized flow passage 128 formed in vent block 87 and end 130 extends from passage 128 into outer housing chamber 84. End 130 of tube 126 forms a bayonet connection that fits over end 132 of spacer 118. The space between the exterior surface of tube 126 and the inner surface of passage 128 forms a flow path 127 for gas pockets positioned below vent block 87. End 124 of tube 126 defines an opening 131. A hole 129 is formed in vent mounting 86 adjacent opening 131. Hole 129 and opening 131 provide a fluid path from flow path 127 to vent chamber 164.

Vent block 87 also forms a high point flow passage 134, inlet end 136 of which receives outlet end 138 of high point vent tube 140. Inlet end 142 of tube 140 is located near the uppermost section of outer housing chamber 84.

A conventional float/reed switch assembly 144 is mounted to housing 90. Assembly 144 includes a float 146 guided by shaft 148 and stroke-limited by washer 150 on shaft 148. End 152 of shaft 148 is secured to a male NPT fitting 154, which is mounted in end 156 of housing 90. In instances where the pressure inside the meter will always be above atmospheric pressure, meter 50 can include an electrically operated valve 162 mounted to outlet 96, which is used to control venting of vent chamber 164. Downward movement of float 146 through a predetermined distance actuates a reed switch (not shown), which provides a signal indicative of a need to vent. This signal is input to a suitable electrical controller 170, which opens valve 162 to vent vent chamber 164. Controller 170 can also energize audible alarm 172 or indicator light 174 when gas is present in chambers 84 or 76, and, thus, when valve 162 needs to be opened. If valve 162 is an electrically operated valve as in FIG. 3, controller 170 can issue a signal to open valve 162. If valve 162 is a manually operated valve of the type shown in FIG. 4, controller 170 can energize audible alarm 172 or indicator light 174 to alert the operator to open valve 162. In certain designs, the reed switch itself can energize indicator light 174 or alarm 172. Alternately, controller 170 can be a computer that performs more complicated functions. An explosion proof electrical junction box 158 is secured to fitting 154 with a coupling 160. Junction box 158 supplies electrical power to assembly 144.

In operation, any gas that collects in inner mechanism chamber 76 and the rotor mounted in chamber 76 tends to rise to and collect at the top of chamber 76. When valve 162 is open, this gas will enter tube 100 through inlet 98, travel through coupling 108, spacer 118, tube 126, and vent chamber 164 and to the exterior of housing 90. Also when valve 162 is open, gas collecting near the undersurface of vent block 87 will enter flow path 127 and flow into vent chamber 164 through hole 129 in vent mounting 86, from where it is vented through valve 162. Similarly, when valve 162 is open, any gas collecting at the top of chamber 84 will be vented via tube 140 through inlet 142, and flow path 127, hole 129, vent chamber 164, and valve 162.

When gas is not present in the meter, liquid will be present in vent chamber 164 and float 146 will be in its upper position on shaft 152. However, when gas collects in chambers 84 or 76, the liquid will be displaced by the gas in vent chamber 164, and float 146 will travel downwardly toward its lower position on shaft 152, and float 146 will activate the reed switch, sending a signal to controller 170. Controller 170 will either open valve 162 (if it is an electrically operated valve) or energize audible alarm 172 or indicator light 174 (if valve 162 is a manually operated valve), in which event the operator will be alerted to open valve 162. Once the gas is vented, liquid returns to vent chamber 164, thus returning the reed switch to its prior state. Controller 170 will then either close valve 162 and deenergize audible alarm 172 or indicator light 174, or, in the case of a manually operated valve, deenergize alarm 172 or indicator light 174 to signal the operator to close valve 162.

Vent housing 90 is self-aligning due to the bayonet connection on end 132 of tube 118. Accordingly, tube 100, tee coupling 108 and tube 118 are first mounted to inner mechanism housing 72. Vent block 87, with tube 140 mounted in place in passage 134, is welded to outer housing 58. Then, vent mounting 86, with all the components mounted to it as shown in FIG. 3, can be loosely bolted to vent block 87, with tube 126 extending downwardly through passage 127. Vent mounting 86 is manipulated until the bayonet connection between tube 126 and tube 118 is made, and then bolt assemblies 93 can be tightened to secure vent mounting 86, and the components mounted to it, in place.

FIG. 4 shows a meter and vent assembly that are identical to those shown in FIG. 3, with the exception that vent assembly 500 shown in FIG. 4 does not include a float/reed switch assembly 144 or a controller 170. Instead, a flat cap 502 is secured to the top of housing 90 to seal it. Valve 504 must, therefore, be manual. Accordingly, the operator must determine from experience when valve 504 should be opened to check whether chambers 84 or 76 need to be vented.

Figure 5:
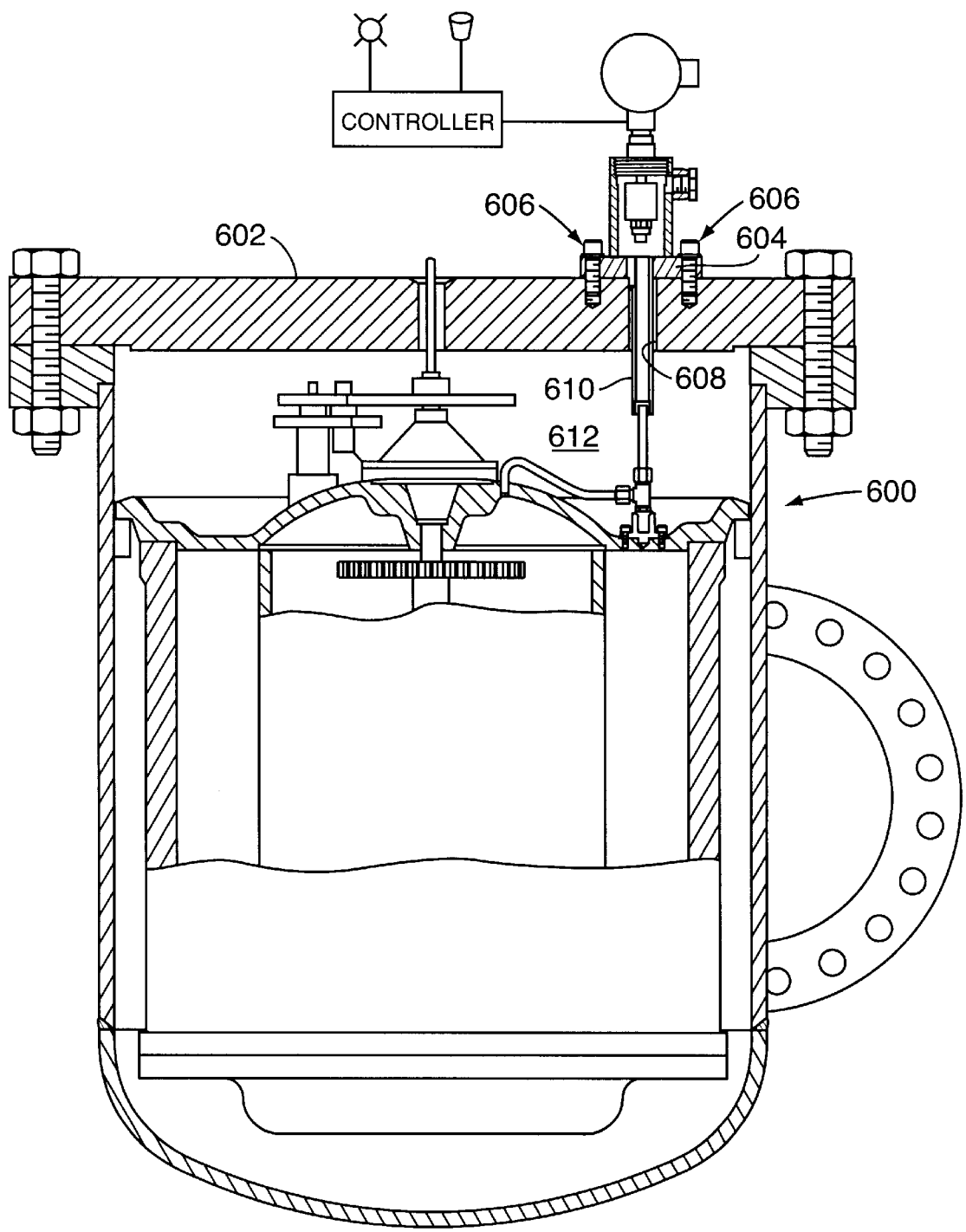
FIG. 5 is a sectional view of a part of another double case, rotary positive displacement meter of the type generally shown in FIGS. 1 and 2, with an alternate embodiment of the vent assembly provided by the present invention.

Meter 600 shown in FIG. 5 is a Smith Meter Inc. Model No. K12 S6 double case, rotary positive displacement meter. With the exception of size and the shape of outer housing 602, and certain other minor construction details, meter 600 is the same as meter 50 shown in FIG. 3. Because outer housing cover 602 is flat, rather than domed as is housing 58 of meter 50, there is no need for a vent block 87. Rather, vent mounting 604 is mounted directly to the upper surface of housing cover 602, again using 4 bolt and washer assemblies 606. Flow path 608 is formed in housing 602, rather than in a vent block. Finally, there is no high point vent tube, since the inlet of tube 610 is already near the top of the outer housing chamber 612 and can vent it effectively without a high point tube, or corresponding passage to flow path 608. Otherwise, the functioning of meter 50 is the same as meter 600.

Accordingly, use of the vent assembly provided by the present invention permits venting of the outer housing chamber and inner mechanism chamber simultaneously using a single vent port. If a float/reed switch assembly is provided, venting of both chambers can be accomplished without the need to manually open a vent to determine whether gas is present in the vent chamber. In instances where the interior of the meter will always be above atmospheric pressure, venting can be accomplished automatically if an electrically operated vent valve is used, which can be opened and closed by a controller.

What is claimed is:

1. A vent assembly adapted to vent gas simultaneously from an inner chamber and an outer chamber comprising:
    a vent port adapted to be mounted in the wall of the outer chamber;
    a first vent path in operable fluid communication with said vent port and adapted to be placed in fluid communication with the outer chamber; and
    a second vent path in fluid communication with said vent port and adapted to be placed in fluid communication with the inner chamber by passing through the outer chamber, said second vent path being independent of and physically separate from said first vent path.

2. The vent assembly recited by claim 1 further comprising a gas indicator.

3. The vent assembly recited by claim 2 wherein the chambers are in a rotary positive displacement flow meter having a rotor mounted in the inner chamber, and said indicator provides an audible signal when the rotor is not vented.

4. The vent assembly recited by claim 3 wherein said indicator provides a visual signal when the rotor is not vented.

5. The vent assembly recited by claim 4 wherein said visual signal is the energization of an indicator light.

6. A vent assembly for a rotary positive displacement flow meter having a rotor comprising:
    a vent chamber;
    a vent port in operable fluid communication with said vent chamber;
    a first vent tube in operable fluid communication with said vent chamber, said first vent tube defining a first fluid passage to said vent chamber;
    a second vent tube in operable fluid communication with said vent chamber, said second vent tube defining a second fluid passage to said vent chamber, said second fluid passage being independent of and physically separate from said first fluid passage;
    a gas detector mounted within said vent chamber; and
    a controller that receives a signal from the gas detector when the rotor is not vented, and operates the venting assembly to vent the rotor.

7. A double case rotary positive displacement flow meter having an inner mechanism including a rotor that is rotated as fluid flows through the meter, an inner mechanism housing that encases the inner mechanism, and an outer housing that encases the inner mechanism housing and the inner mechanism, and a vent assembly having a first vent mounted to the meter, said first vent defining an inlet that is in fluid communication with the interior of the rotor of the meter to vent the rotor, said first vent defining an outlet that is in fluid communication with the exterior of the meter, and a second vent that defines a fluid path between the outer housing chamber of the meter and the exterior of the meter.

8. The meter recited by claim 7 wherein the vent assembly further comprises a gas indicator.

9. The meter recited by claim 8 wherein said indicator provides an audible signal when the rotor is not vented.

10. The meter recited by claim 8 wherein said indicator provides a visual signal when the rotor is not vented.

11. The meter recited by claim 10 wherein said visual signal is the energization of an indicator light.

12. The meter recited by claim 7 wherein said vent assembly further comprises a high point vent.

13. A vent assembly for simultaneously venting an inner chamber and an outer chamber, said vent assembly comprising:

a vent valve in operable fluid communication with a vent chamber;

a first vent path in operable fluid communication with said vent chamber and the outer chamber;

a vent tube in operable fluid communication with said vent chamber and the inner chamber through the outer chamber, said vent tube defining a second vent path that is independent of and physically separate from said first vent path.

14. The vent assembly recited by claim 13 wherein said vent tube extends through said first vent path.

* * * * *